US009451631B2

United States Patent
Lee et al.

(10) Patent No.: US 9,451,631 B2
(45) Date of Patent: Sep. 20, 2016

(54) METHOD AND APPARATUS FOR TRANSMITTING SIGNAL IN DEVICE-TO-DEVICE COMMUNICATION

(71) Applicant: LG ELECTRONICS INC., Seoul (KR)

(72) Inventors: Jihyun Lee, Seoul (KR); Seungmin Lee, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 14/451,245

(22) Filed: Aug. 4, 2014

(65) Prior Publication Data

US 2015/0049740 A1 Feb. 19, 2015

Related U.S. Application Data

(60) Provisional application No. 61/865,627, filed on Aug. 14, 2013.

(51) Int. Cl.
*H04W 72/12* (2009.01)

(52) U.S. Cl.
CPC ................ *H04W 72/1268* (2013.01)

(58) Field of Classification Search
None
See application file for complete search history.

(56) References Cited

U.S. PATENT DOCUMENTS

| | | | |
|---|---|---|---|
| 2010/0115367 A1* | 5/2010 | Hsu | H04L 1/189 714/748 |
| 2013/0250924 A1* | 9/2013 | Chen | H04L 1/1819 370/336 |
| 2014/0040694 A1* | 2/2014 | Verma | H04L 1/1812 714/748 |
| 2014/0056220 A1* | 2/2014 | Poitau | H04W 40/246 370/328 |
| 2014/0269453 A1* | 9/2014 | Papasakellariou | H04B 7/2643 370/280 |

* cited by examiner

*Primary Examiner* — Mohammad Adhami

(74) *Attorney, Agent, or Firm* — Lee, Hong, Degerman, Kang & Walmey; Jonathan Kang; Michael Monaco

(57) ABSTRACT

A method for transmitting an uplink signal of a user equipment (UE) in a wireless communication system includes receiving an uplink (UL) grant from a serving base station and performing UL transmission based on the UL grant or device-to-device (D2D) communication, according to a configuration for D2D communication and a configuration of transmission time interval (TTI) bundling. When bundled UL transmission based on the UL grant and transmission for D2D communication are scheduled in the same TTI, the UL transmission scheduled in the TTI is performed in a first available TTI after the TTI, and, when two bundled UL transmissions according to two different UL grants are scheduled in the same TTI, bundled UL transmission according to the later received UL grant of the two different UL grants is dropped.

14 Claims, 16 Drawing Sheets

FIG. 7
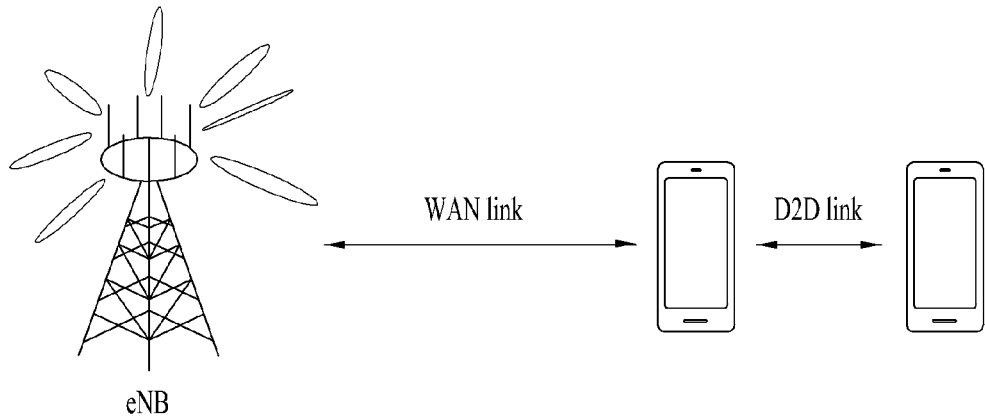
FIG. 8
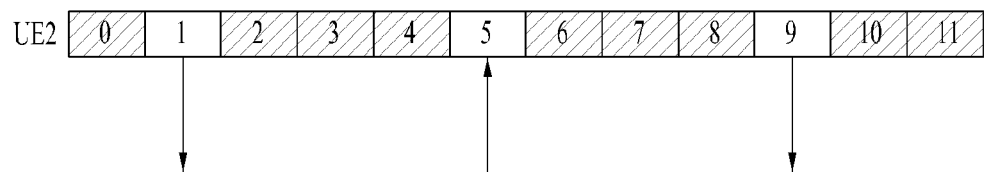
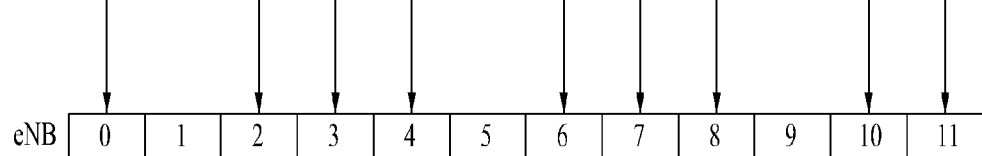

| SUBFRAME | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| D | 0 | | | | 1 | | | | 2 | | | | 3 | | | | 0 |
| U | | | | | 0 | 0 | × | 0 | | | | | | | | | |
|  | | | | | | | | | 1 | 1 | 1 | × | | | | | |
|  | | | | | | | | | | | | | 2 | 2 | 2 | 2 | |
|  | 3 | 3 | 3 | 3 | | | | | | | | | | | | | 3 |

D2D SUBFRAME

| SUBFRAME | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| D | 0 | | | | | | | | | | | | | | | | 0 |
| U | | | | | 0 | 0 | × | 0 | 0 | | | | | | | | |

D2D SUBFRAME

| SUBFRAME | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| D | 0 | | | | 1 | | | | 2 | | | | 3 | | | | 0 |
| U | | | | | 0 | 0 | × | 0 | | | | | | | | | |
|  | | | | | | | | | 1 | 1 | 1 | × | 1 | | | | |
|  | | | | | | | | | | | | | 2 | 2 | 2 | 2 | |
|  | 3 | 3 | 3 | 3 | | | | | | | | | | | | | 3 |

D2D SUBFRAME

D2D SUBFRAME

D2D SUBFRAME

D2D SUBFRAME

FIG. 24

| SUBFRAME | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|
| D | | 1 | | | | | | | | | 3 | | | | | | | | | 1 | | | | | | |
| U | 0 | 0 | X | 0 | 0 | 1 | 1 | | 1 | 1 | | | | | | 0 | | | | 0 | 0 | 0 | 0 | | | |
| U | | | | | | | | X | | | 2 | 2 | 2 | 2 | 3 | 3 | 3 | 3 | | | | | | 1 | 1 | 1 |

▨ D2D SUBFRAME

METHOD AND APPARATUS FOR TRANSMITTING SIGNAL IN DEVICE-TO-DEVICE COMMUNICATION

CROSS-REFERENCE TO RELATED APPLICATIONS

Pursuant to 35 U.S.C. §119(e), this application claims the benefit of U.S. Provisional Patent Application Ser. No. 61/865,627, filed on Aug. 14, 2013, the contents of which are hereby incorporated by reference herein in its entirety.

BACKGROUND OF THE INVENTION

1. Field of the Invention

The present invention relates to a wireless communication system, and, more particularly, to a method and apparatus for transmitting a signal in device-to-device communication.

2. Discussion of the Related Art

In cellular communication, a user equipment (UE) existing in a cell accesses a base station in order to perform communication, receives control information for exchanging data from the base station, and transmits and receives data from and to the base station. That is, since the UE transmits and receives data via the base station, the UE transmits data thereof to the base station in order to transmit the data to another cellular UE and the base station, which has received the data, transmits the received data to another UE. Since one UE should transmit data to another UE via a base station, the base station performs channel and resource scheduling for data transmission and reception and transmits channel and resource scheduling information to each UE. When communication between UEs is performed via a base station, channel and resource assignment for data transmission and reception between each UE and the base station is necessary. However, in device-to-device communication, a UE has a structure for directly transmitting and receiving a signal to and from another UE without intervention of a base station or a relay.

Since device-to-device communication of a UE is performed in parallel with communication between a UE and a base station, collision there between may occur. There is a need for a method for preventing or dealing with such collision.

SUMMARY OF THE INVENTION

An object of the present invention devised to solve the problem lies in a method for efficiently performing signal transmission for device-to-device communication of a user equipment (UE) and UE-to-base station communication in a wireless communication system.

The technical problems solved by the present invention are not limited to the above technical problems and other technical problems which are not described herein will become apparent to those skilled in the art from the following description.

The object of the present invention can be achieved by providing a method for transmitting an uplink signal of a user equipment (UE) in a wireless communication system including receiving uplink (UL) grants from a serving base station and performing the UL grant based-UL transmission in a TTI bundle or device-to-device (D2D) reception/transmission (Rx/Tx) using a configuration for D2D communication and a configuration for transmission time interval (TTI) bundling, wherein, if the UL transmission in the TTI bundle and the D2D Rx/Tx are simultaneously scheduled in a specific TTI, the UL transmission scheduled in the specific TTI is performed in a first available TTI after the specific TTI, and wherein, if two different UL grants based-UL transmissions are simultaneously scheduled in a specific TTI, the UL transmission indicated by the later received UL grant of the two different UL grants is dropped.

Additionally or alternatively, if the UL transmission in the TTI bundle and the D2D Rx/Tx are simultaneously scheduled in the specific TTI and the specific TTI is a first TTI of the TTI bundle, the UL transmission scheduled in the specific TTI may be dropped.

Additionally or alternatively, the configuration for D2D communication may include information on a subframe or TTI configured for D2D communication.

The method may further include receiving the configuration for D2D communication and the configuration for TTI bundling.

In another aspect of the present invention, provided herein is a user equipment (UE) configured to transmit an uplink signal in a wireless communication system including a radio frequency (RF) unit and a processor configured to control the RF unit, wherein the processor is configured to receive uplink (UL) grants from a serving base station and to perform the UL grant based-UL transmission in a TTI bundle or device-to-device (D2D) reception/transmission (Rx/Tx) using a configuration for D2D communication and a configuration for transmission time interval (TTI) bundling, wherein, if the UL transmission in the TTI bundle and the D2D Rx/Tx are simultaneously scheduled in a specific TTI, the UL transmission scheduled in the specific TTI is performed in a first available TTI after the specific TTI, and wherein, if two different UL grants-based UL transmissions are simultaneously scheduled in a specific TTI, the UL transmission indicated by the later received UL grant of the two different UL grants is dropped.

Additionally or alternatively, if UL transmission in the TTI bundle and the D2D Rx/Tx are simultaneously scheduled in the specific TTI and the specific TTI is a first TTI of the TTI bundle, the processor may be configured to drop the UL transmission scheduled in the specific TTI.

Additionally or alternatively, the configuration for D2D communication may include information on a subframe or TTI configured for D2D communication.

Additionally or alternatively, the processor may be configured to receive the configuration for D2D communication and the configuration for TTI bundling.

The aspects of the present invention are only a part of the preferred embodiments of the present invention, and various embodiments based on technical features of the present invention may be devised and understood by one of ordinary skill in the art based on the detailed description of the present invention.

According to one embodiment of the present invention, it is possible to improve efficiency of device-to-device communication and UE-to-base station communication in a wireless communication system.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings:

FIG. 7 is a diagram showing a device-to-device (D2D) communication method according to one embodiment of the present invention;

FIG. 8 is a diagram showing a configuration for D2D communication or UL transmission according to one embodiment of the present invention;

FIG. 24 is a diagram showing a method for dealing with collision between TTI bundling and D2D transmission according to one embodiment of the present invention;

DETAILED DESCRIPTION OF THE INVENTION

Figure 1:
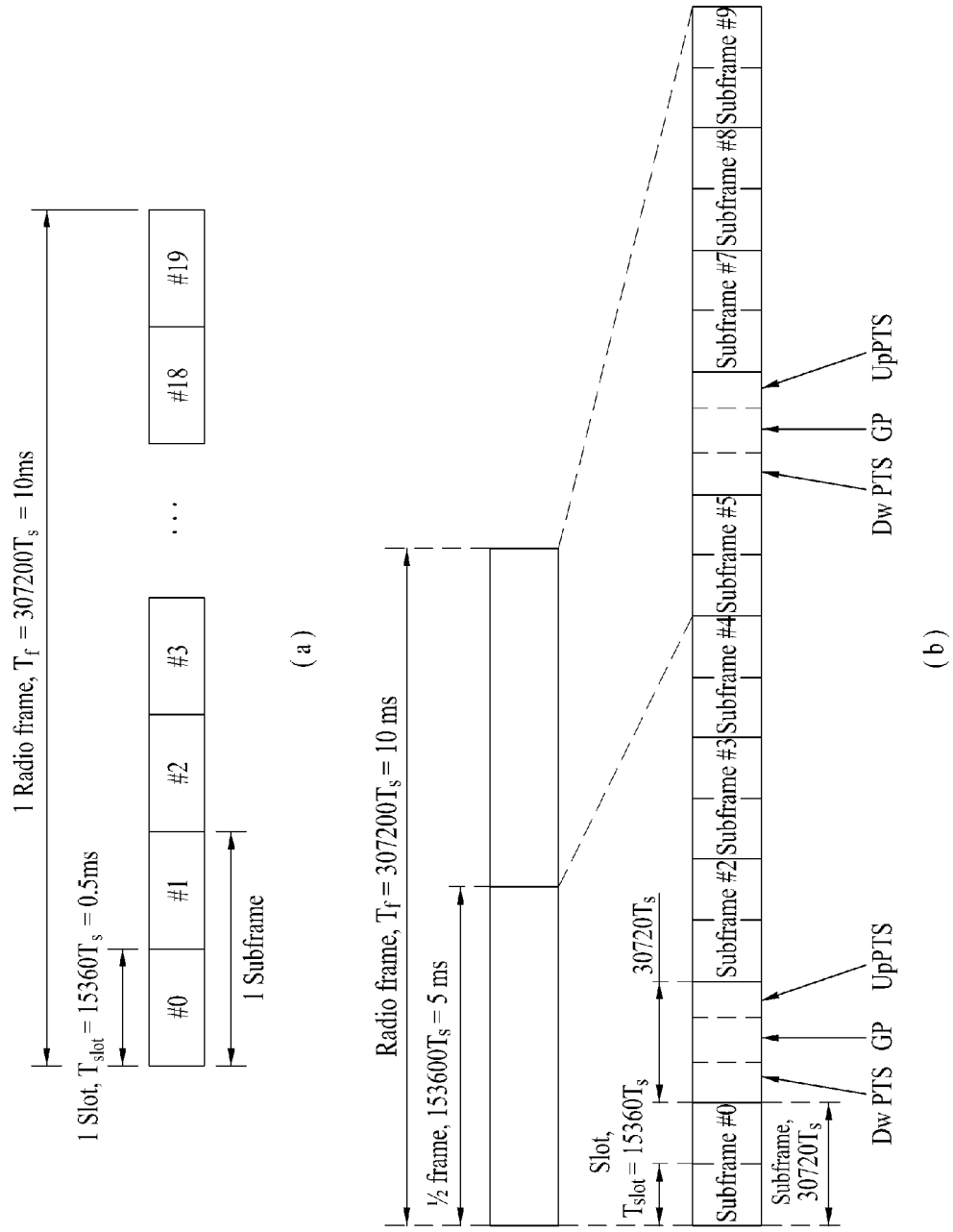
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/ random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | $12800 \cdot T_s$ |                  |                  |
| 8 | $24144 \cdot T_s$ |                  |                  | —                 | —                | —                |
| 9 | $13168 \cdot T_s$ |                  |                  | —                 | —                | —                |

Figure 2:
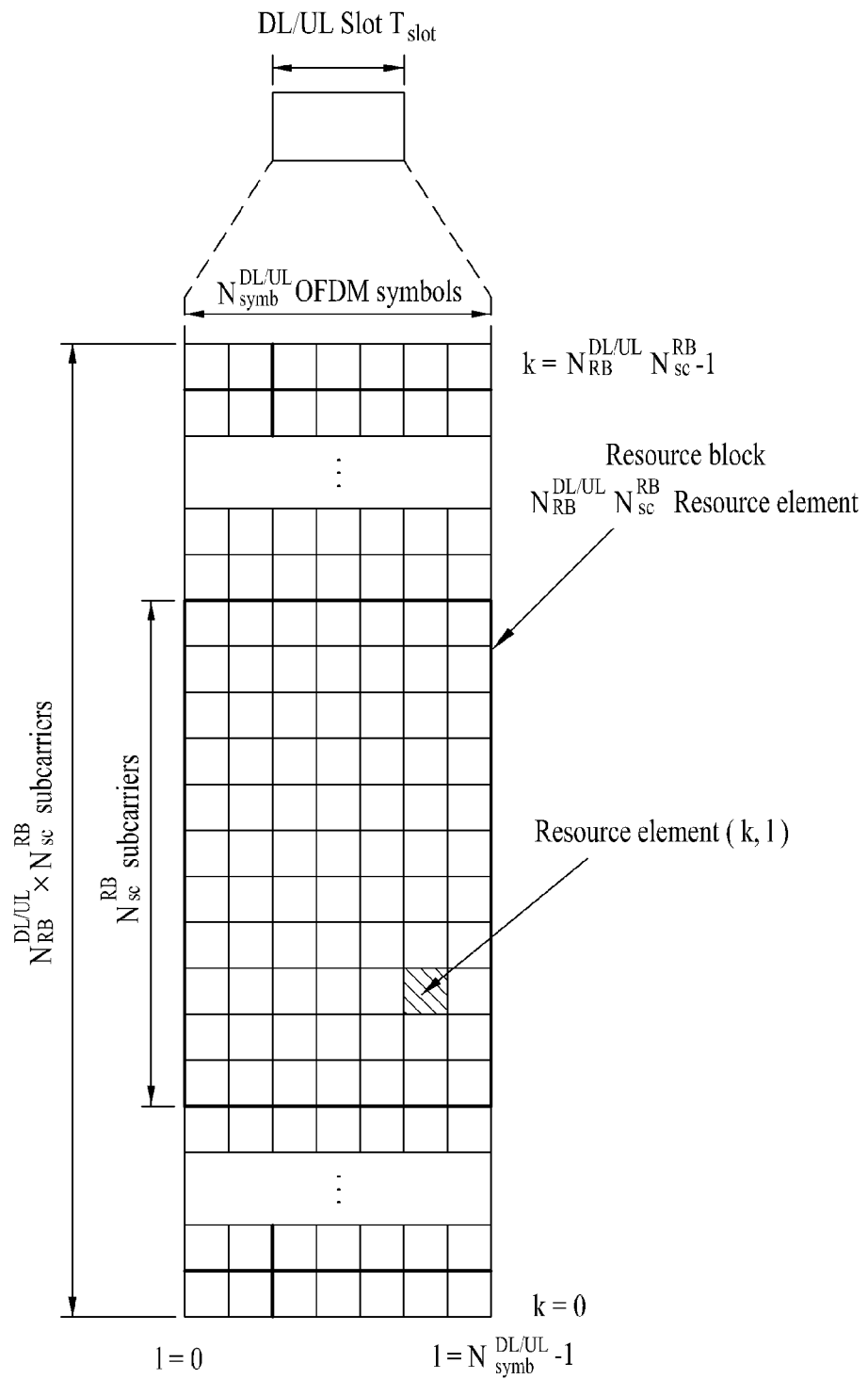
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $N_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
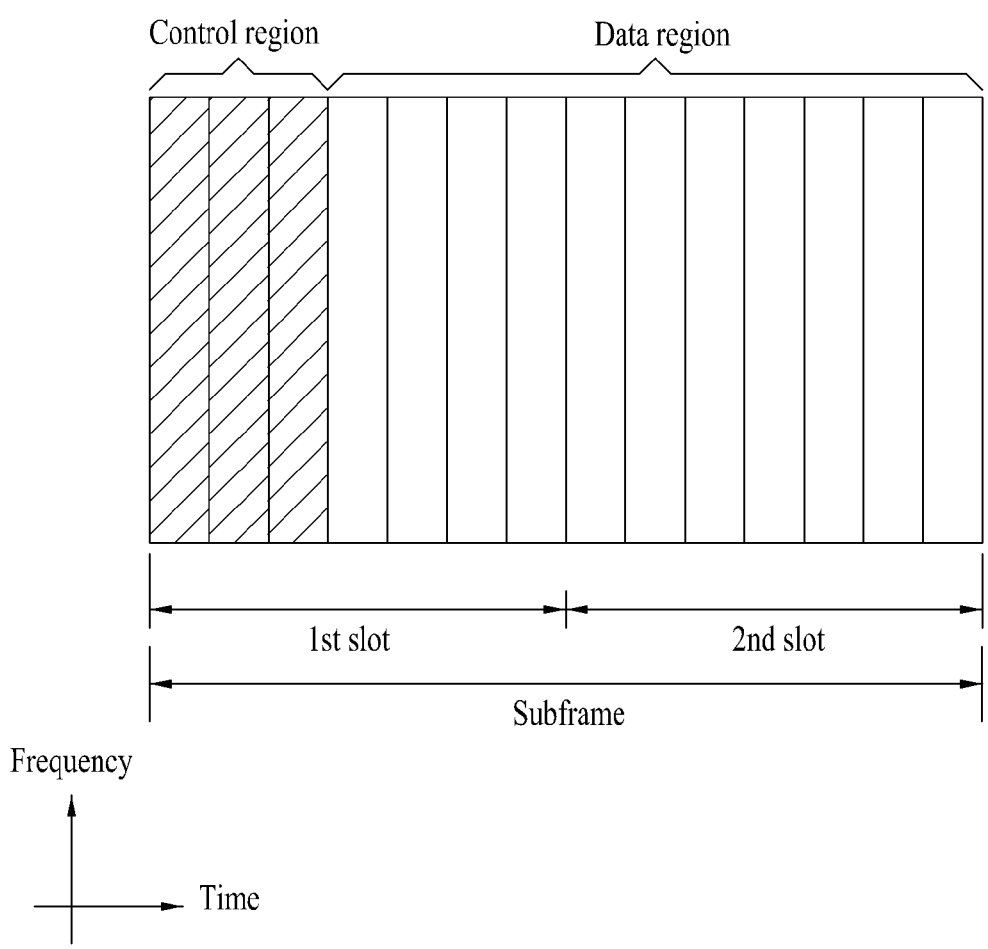
FIG. 3 is a downlink (DL) subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE (-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
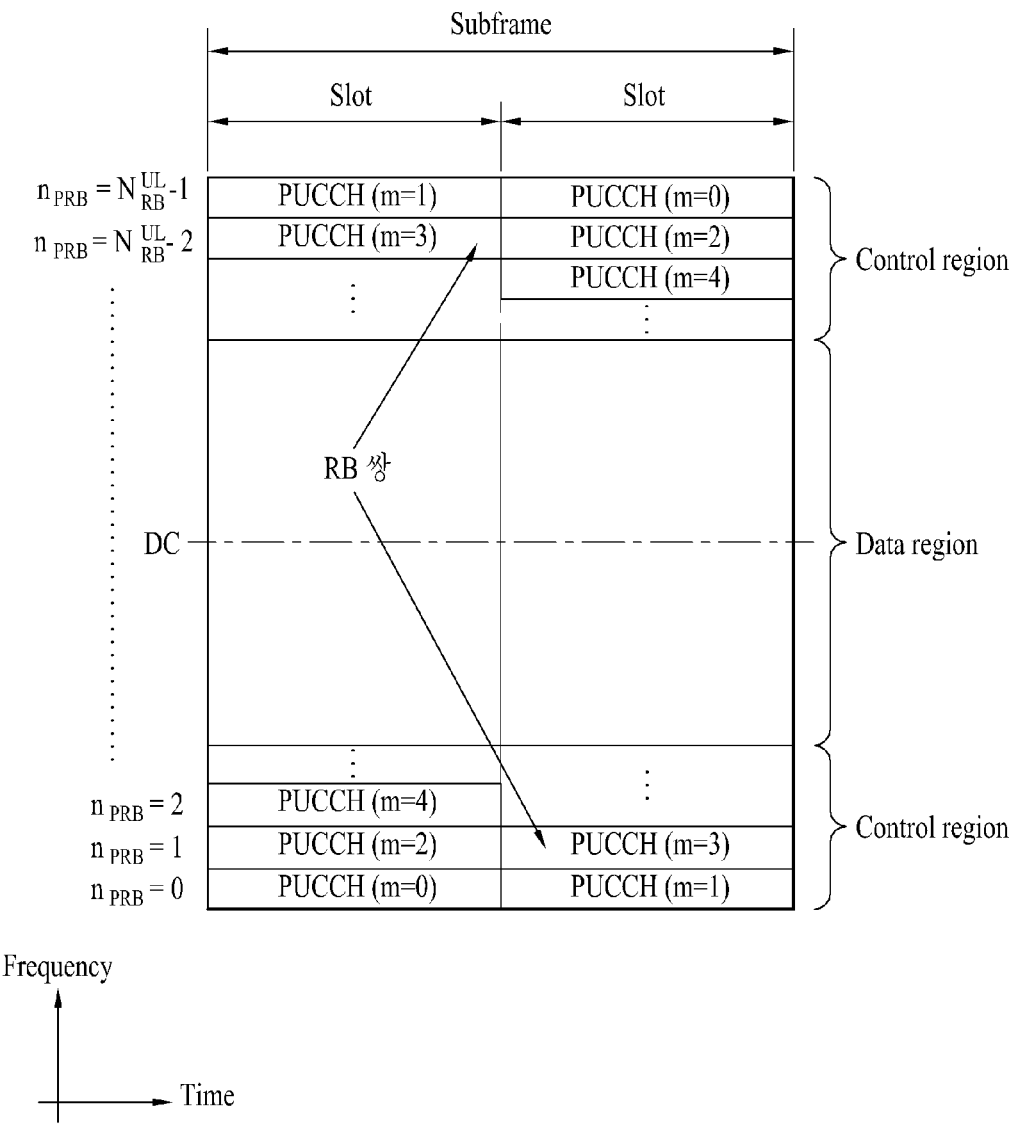
FIG. 4 is a diagram showing an uplink (UL) subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Figure 5:
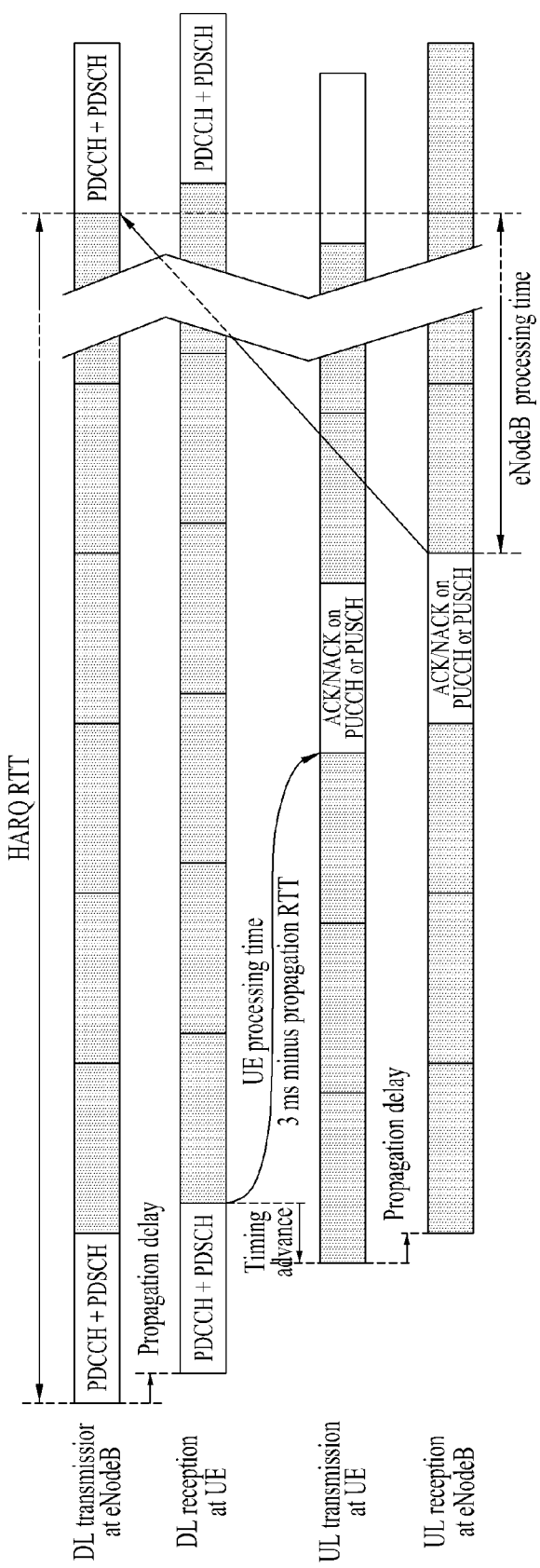
FIG. 5 is a diagram showing a downlink HARQ process in a 3GPP LTE/LTE-A FDD system.
Figure 6:
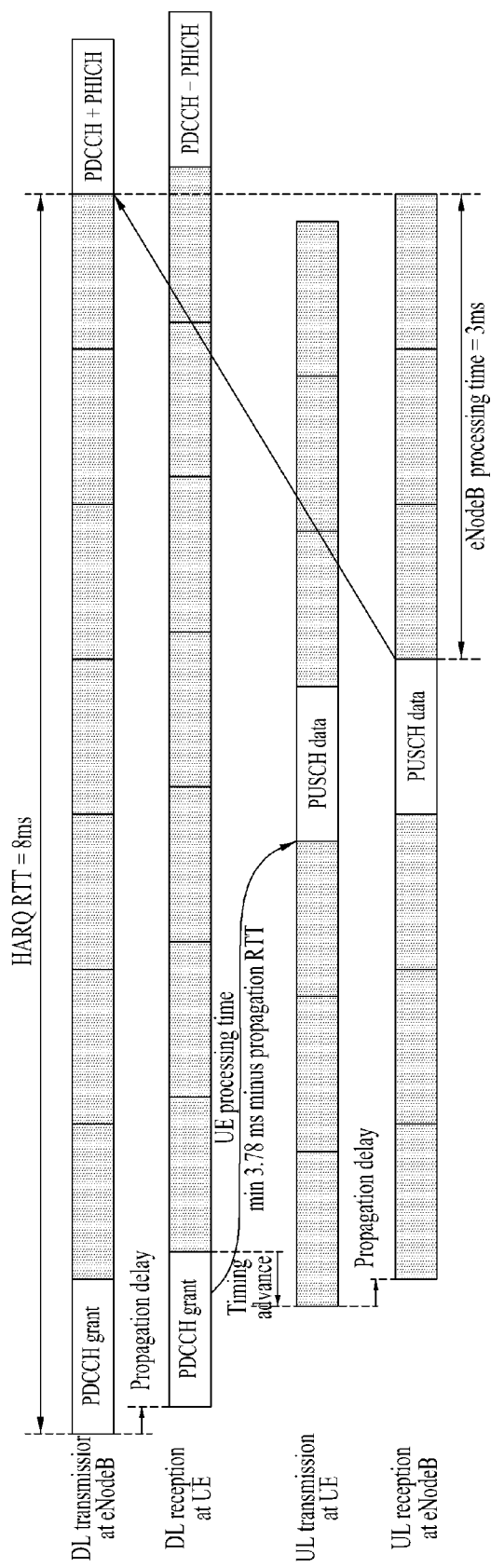
FIG. 6 is a diagram showing an uplink HARQ process in a 3GPP LTE/LTE-A FDD system.

FIG. 5 shows a downlink HARQ process in an LTE FDD system and FIG. 6 shows an uplink HARQ process in an LTE FDD system.

In the LTE FDD system, eight stop-and-wait (SAW) HARQ processes are supported in uplink and downlink at a constant round trip time (RTT) of 8 ms.

Each HARQ process is defined by a unique HARQ process identifier (or number) having a size of 3 bits (4 bits in case of LTE TDD) and individual soft buffer assignment for combination of retransmitted data is necessary in a receiver (that is, a UE in a downlink HARQ process or an eNodeB in an uplink HARQ process). In addition, in an LTE system, for HARQ operation, signaling of information, such as new data indicator (NDI), redundancy version (RV) and modulation and coding scheme (MCS) level, to a receiver is defined.

A downlink HARQ process of an LTE system is an adaptive asynchronous method. Accordingly, per downlink transmission, downlink control information for a HARQ process is explicitly involved. In contrast, an uplink HARQ process of an LTE system is a synchronous method and may be adaptive or non-adaptive. Since an uplink non-adaptive HARQ scheme does not involve explicit signaling of control information, a predetermined RV sequence, that is, a sequence of 0, 2, 3, 1, 0, 2, 3, 1, . . . is required for continuous packet transmission. However, in an uplink adaptive HARQ scheme, RV is explicitly signaled.

In the present invention, UE operation in a subframe (SF), in which transmission and reception resources between a UE and a peer UE and transmission and reception resources between the UE and a serving eNB collide, is defined. In particular, the UE is configured to use acknowledgement/negative acknowledgment (AN) repetition or transmission time interval (TTI) bundling. The UE supports direct communication between UEs, that is, device-to-device (D2D) communication, and may be a normal UE or a relay UE in terms of function.

The SF in which collision between D2D operation and WAN operation occurs refers to an SF in which WAN UL transmission is restricted due to D2D operation and may include an SF configured to enable a UE to transmit a D2D signal to a peer UE and an SF configured to enable a UE to receive a D2D signal from a peer UE.

FIG. 7 is a diagram showing an example in which UE1 located in network coverage operates as a relay UE of UE2 located outside the network coverage.

A cell edge UE may repeatedly transmit the same information in a plurality of (consecutive) SFs, when TTI bundling or AN repetition is used for cell edge UEs in order to increase UL coverage and improve reliability. The UE may repeatedly transmit the same AN or PUSCH information in a plurality of consecutive SFs if AN repetition or TTI bundling is configured.

A network may assign a specific SF or SF set to a D2D link for communication between UEs according to a UE's request or a predetermined rule.

For example, as shown in FIG. 8, specific SFs may be periodically assigned to D2D links and some of the specific SFs may be used for transmission (Tx) of a UE and the remaining SFs may be used for reception (Rx) of the UE.

If SFs for a D2D link and a WAN link are divided in the time domain, the UE may not perform WAN UL transmission in an SF assigned to D2D signal transmission and reception and may not perform D2D signal transmission and reception in an SF for performing WAN UL transmission.

Accordingly, if an SF which is configured for a D2D link to block WAN UL transmission (that is, a D2D SF) is located in an AN repetition interval when AN repetition is configured or if an SF in which WAN UL transmission is blocked (that is, a D2D SF) is located in a bundled SF when TTI bundling is used, collision between D2D operation and WAN UL operation in the SF occurs.

In order to solve the above-described problem, the following method may be used. In the following description, WAN UL transmission is simply referred to as "UL transmission" and a WAN UL SF is simply referred to as a "UL SF".

First Embodiment—ACK/NACK Repetition

Case in which D2D Operation of a UE has Priority Higher than that of WAN UL Operation The UE may drop a D2D SF from valid UL SF candidates for AN repetition/TTI bundling.

Method for Dropping a Dropped UL SF from an AN Repetition Value $N_{ANRep}$ or a TTI Bundling Value This method refers to a method for updating the value $N_{ANRep}$ to $N_{ANRep}-1$ while dropping UL AN transmission from the SF when collision between D2D transmission and reception and UL AN transmission occurs (that is, D2D transmission and UL transmission overlap in one transmission opportunity (e.g., SF). That is, AN for a PDSCH received in SF #n−4 is repeatedly transmitted in SF #n, #n+1, . . . , #n+$N_{ANRep}$−1+$N_{D2D}$ and AN is not transmitted in the corresponding SF. $N_{D2D}$ is the number of D2D SFs appearing until the number of UL SFs valid for AN repetition transmission satisfies $N_{ANRep}$ and the value $N_{ANRep}$ is updated to $N_{ANRep}-1$ whenever a D2D SF appears. AN may be transmitted in a state of being embedded in a PUCCH and PUSCH.

Figure 9:
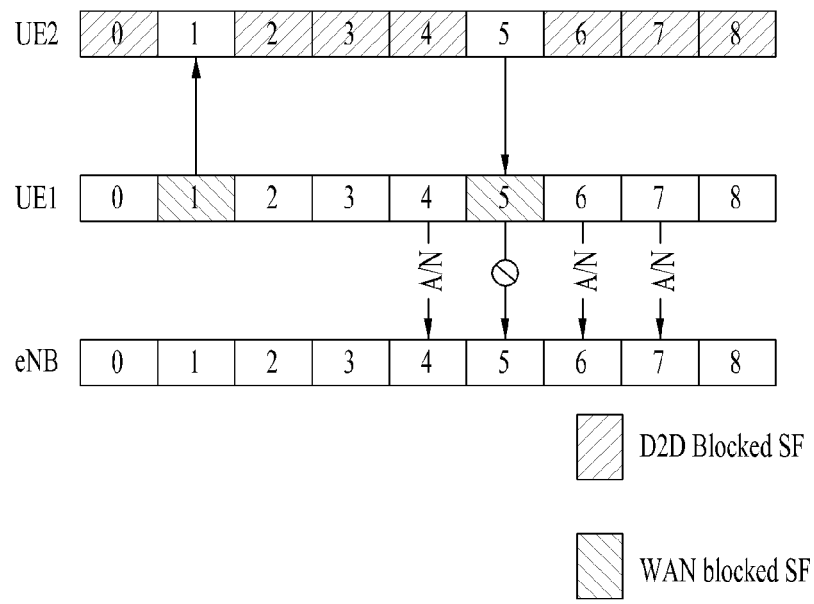
FIG. 9 is a diagram showing a method for dealing with collision between ACK/NACK repetition and D2D transmission according to one embodiment of the present invention.

FIG. 9 shows the case in which AN for a PDSCH received in SF #0 is repeatedly transmitted in SFs #4, #6 and #7 if the proposed method is used, when the value $N_{ANRep}$ is 4.

Method for Not Dropping a Dropped UL SF from an AN Repetition Value $N_{ANRep}$ or a TTI Bundling Value when Collision Between D2D Transmission and Reception and ULAN Transmission Occurs.

This method refers to a method for dropping UL AN transmission from the corresponding SF and maintaining the value $N_{ANRep}$. That is, AN for a PDSCH received in SF #n−4 is repeatedly transmitted in SF #n, #n+1, . . . , #n+$N_{ANRep}$−1+$N_{D2D}$ and AN is not transmitted in the corresponding SF.

Figure 10:
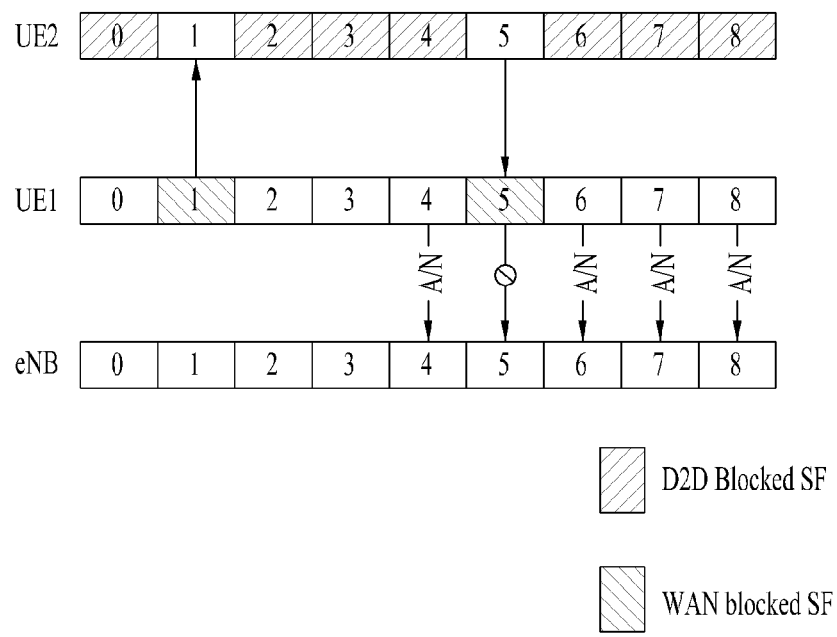
FIG. 10 is a diagram showing a method for dealing with collision between ACK/NACK repetition and D2D transmission according to one embodiment of the present invention.

FIG. 10 shows the case in which AN for a PDSCH received in SF #0 is repeatedly transmitted in SFs #4, #6 and #7 if the proposed method is used, when the value $N_{ANRep}$ is 4.

Case in which WAN UL Operation of a UE has Priority Higher than that of D2D Operation The UE drops a UL SF from D2D SF candidates valid for D2D communication. If this method is used, WAN UL operation including AN repetition, TTI bundling, etc. may be valid even in a D2D SF.

At this time, as the number of valid SFs is reduced, D2D transmission and reception operation may be changed as follows.

A Rule May Be Defined to Combine Valid D2D SFs Left via the Above Process to (Re-)index SFs.

Figure 11:
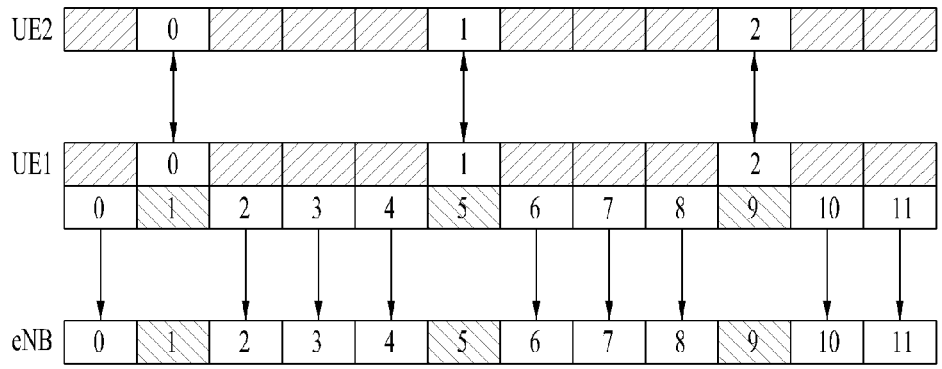
FIG. 11 is a diagram showing a configuration for D2D communication or UL transmission according to one embodiment of the present invention.

FIG. 11 shows the case in which D2D SFs, that is, SFs valid for D2D transmission and reception, are separately indexed. SFs excluding SFs configured for WAN UL operation are sequentially indexed.

At this time, when SFs in which collision with UL transmission occurs are dropped from valid D2D SFs, the SFs are newly indexed similarly to non-D2D SFs.

Figure 12:
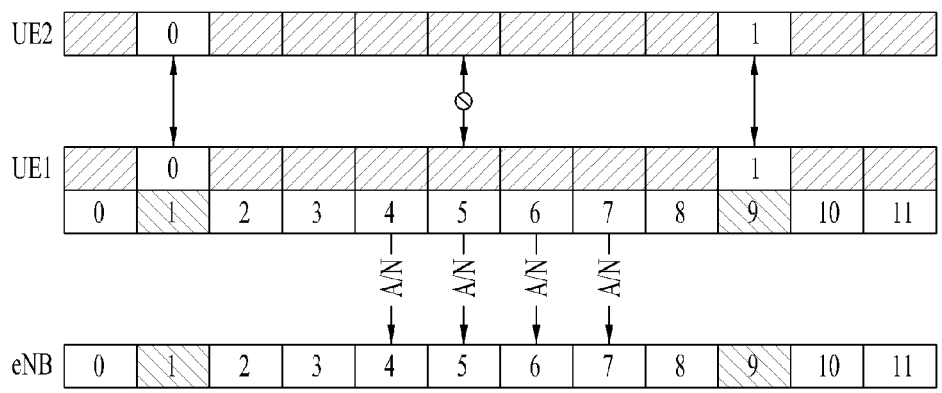
FIG. 12 is a diagram showing a method for dealing with collision between ACK/NACK repetition and D2D transmission according to one embodiment of the present invention.

FIG. 12 shows the case in which SF #5 (D2D SF #1) is dropped from valid D2D SFs in order to transmit AN for a PDSCH received in SF #0 (D2D SF #0), when the value $N_{ANRep}$ is 4. At this time, D2D operation scheduled to SF #5 (D2D SF #1 before re-indexing) may be performed in SF #9 (D2D SF #2 before re-indexing) via SF (re-)indexing.

As another method, by dropping a D2D SF in which collision with UL transmission occurs from valid D2D SFs, D2D operation scheduled to the SF may be performed in a valid D2D SF first appearing thereafter. For example, in FIG. 13, as SF #5 which is a D2D SF, is dropped from valid D2D SFs, D2D operation scheduled to SF #5 is performed in SF #9 which is a D2D SF first appearing thereafter.

At this time, D2D operation may include AN repetition and TTI bundling and a D2D SF dropped from valid D2D SFs may or may not be dropped from the AN repetition value $N_{ANRep}$ or TTI bundling value using the same method as the WAN link.

Second Embodiment—TTI Bundling

Figures 13, 14:
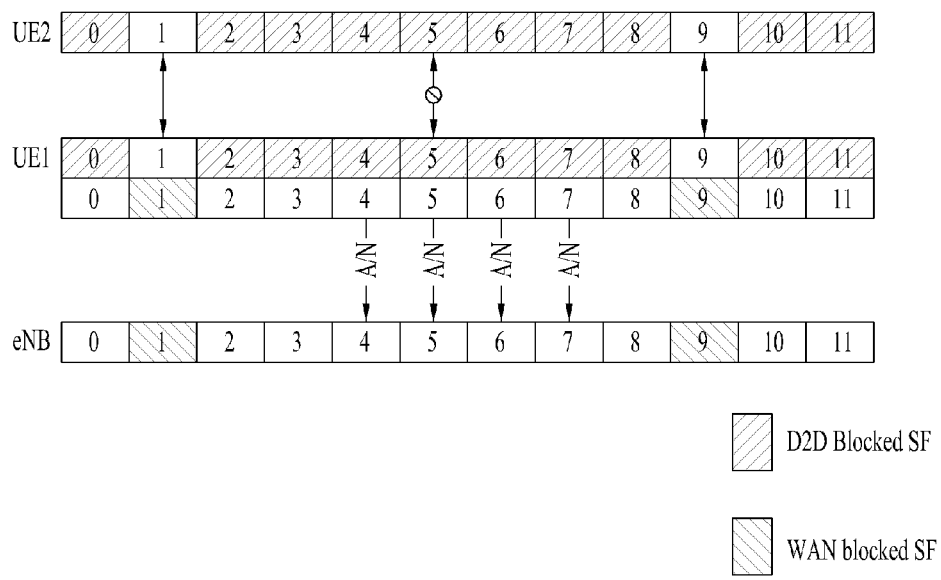
FIG. 13 is a diagram showing a method for dealing with collision between ACK/NACK repetition and D2D transmission according to one embodiment of the present invention.
FIG. 14 is a diagram showing a HARQ process and TTI bundling transmission in a 3GPP LTE/LTE-A FDD system.

The above-described embodiment for ACK/NACK repetition is applicable to TTI bundling. This will be described in detail. FIG. 14 shows an example of performing four HARQ processes in a cycle of 16 ms when TTI bundling is used. The example of FIG. 14 shows the case in which an SF for a D2D link is not configured.

At this time, if a D2D SF is configured during a bundle transmission, UL transmission and D2D transmission (or reception) occurs. For example, if SF #6 is configured as a D2D SF, UL transmission in SF #6 may be impossible. However, dropping of UL transmission of the TTI is not suitable and a method for dealing with collision occurring when a D2D SF is configured during TTI bundle transmission according to the following embodiments will be described.

TTI Drop

Figure 15:
FIG. 15 is a diagram showing a method for dealing with collision between TTI bundling and D2D transmission according to one embodiment of the present invention.

FIG. 15 shows a method for dealing with collision between a D2D SF and a UL SF according to one embodiment of the present invention. Shaded SF #6 and SF #11 are D2D SFs. If a D2D SF and a TTI bundle for UL transmission collide, UL transmission is dropped in the SF in which collision occurs and then the number of TTIs of the TTI bundle is reduced by 1. In this method, the number of validly bundled TTIs is reduced by dropping UL transmission in the D2D SF but a UL (transmission or retransmission) grant transmission time and the number of HARQ processes are equal to those of the case in which D2D is not configured.

TTI Shift

Figure 16:
FIG. 16 is a diagram showing a method for dealing with collision between TTI bundling and D2D transmission according to one embodiment of the present invention.

FIG. 16 shows a method for dealing with collision between a D2D SF and a WAN UL SF according to another embodiment of the present invention.

If a D2D SF and a TTI bundle collide, UL transmission is dropped in an SF in which collision occurs and the number of TTI bundles (TTI value) is maintained. In this method, the validly bundled TTI value is maintained.

Figure 17:
FIG. 17 is a diagram showing problems which may occur in the methods of FIGS. 15 and 16.

At this time, when a UL grant time is maintained, as shown in FIG. 17, first UL transmission of a bundle may be scheduled to an SF in which UL transmission is impossible. In FIG. 17, since HARQ process 1 uses five SFs for transmission of one bundle, process 2 and process 3 are scheduled to SFs (SF #8 and SF #12) in which UL transmission is impossible.

In order to solve such a problem, the following methods may be used.

MODIFIED EXAMPLE 1

Figure 18:
FIG. 18 is a diagram showing a method for dealing with collision between TTI bundling and D2D transmission according to one embodiment of the present invention.

The UE drops transmission of a TTI bundle upon receiving scheduling of an SF in which UL transmission is impossible. That is, the corresponding TTI is not only dropped but a TTI bundle, to which an SF in which UL transmission is impossible belongs, is also dropped. In the example of FIG. 18, bundle transmission of a PDCCH received by the UE in SF #4 is dropped because UL transmission is impossible in SF #8. In this case, the eNB may not perform scheduling of the SF in which UL transmission is impossible (that is, scheduling of SF #4) and the UE may assume that errors have occurred if scheduling is received in the corresponding SF.

MODIFIED EXAMPLE 2

Figure 19:
FIG. 19 is a diagram showing a method for dealing with collision between TTI bundling and D2D transmission according to one embodiment of the present invention.

Even when first UL transmission of a TTI bundle is scheduled to a D2D SF such that UL transmission is impossible, TTI shifting may not be performed and the TTI bundle may be dropped similarly to the case in which first UL transmission is scheduled to an unusable SF. FIG. 19 shows an example of dropping a TTI bundle when a first SF of the TTI bundle is configured as a D2D SF.

MODIFIED EXAMPLE 3

Figure 20:
FIG. 20 is a diagram showing a method for dealing with collision between TTI bundling and D2D transmission according to one embodiment of the present invention.

As another method, although the UE fundamentally uses a TTI shift method, processing may be changed depending on whether an SF in which UL transmission is impossible is a D2D SF. That is, when the UE receives scheduling of an SF in which UL transmission is impossible, if the SF is configured as a D2D SF, the UE drops UL transmission of the TTI and performs UL transmission in a first SF after the TTI bundle (that is, the TTI value is maintained). In contrast, if the SF is not configured as a D2D SF, the UE drops UL transmission of the TTI and then subtracts 1 from the TTI bundle value). That is, TTI shift is performed for a D2D SF and TTI drop is performed for a non-D2D SF. FIG. 20 shows a method for processing an SF depending on whether the SF in which UL transmission is impossible is configured as a D2D SF.

Figure 21:
FIG. 21 is a diagram showing a method for dealing with collision between TTI bundling and D2D transmission according to one embodiment of the present invention.

In addition, if first UL transmission of a TTI bundle is scheduled to a D2D SF such that UL transmission is impossible, transmission is dropped in the corresponding SF. That is, if the D2D SF is a first SF of each TTI bundle, only TTI drop may be performed. FIG. 21 shows the above example.

MODIFIED EXAMPLE 4

By scheduling of a D2D SF, different methods are applicable to the case in which first UL transmission of a bundle may not be performed and the other case.

As shown in FIG. 19, UL transmission scheduled to SF 0 may drop a bundle but UL transmission scheduled to SF 8 may drop only a first TTI.

MODIFIED EXAMPLE 5

Figure 22:
FIG. 22 is a diagram showing a method for dealing with collision between TTI bundling and D2D transmission according to one embodiment of the present invention.

As another example, the UE may apply a TTI shift method to the case in which UL grant is received in an SF in which UL transmission is impossible such that the TTI is transmitted in a next transmissible UL SF. At this time, the number of processes performed in a cycle of 16 ms should be reduced or the cycle of the HARQ process should be changed to more than 16 ms (that is, 16+the number of D2D SFs) and the number of D2D SFs configured in a HARQ cycle should be maintained at a constant level. FIG. 22 shows an example in which a TTI shift method is applied to UL transmission corresponding to all UL grants such that only three HARQ processes are performed in a cycle of 16 ms.

MODIFIED EXAMPLE 6

Figure 23:
FIG. 23 is a diagram showing a method for dealing with collision between TTI bundling and D2D transmission according to one embodiment of the present invention.

A method for changing a UL grant transmission (reception) time is also possible. FIG. 23 shows an example in which scheduling is performed such that transmission of one bundle is finished and then a next bundle is transmitted, and a UL grant transmission time is configured after first UL transmission of each bundle is always performed 4 ms after UL grant reception. At this time, synchronous HARQ operation is possible only when the D2D SF is repeatedly configured in a cycle of 16 ms.

MODIFIED EXAMPLE 7

If a D2D link is established, an asynchronous HARQ process may be defined independently of the case in which a D2D link is not established. FIG. 24 shows the case in which, when bundle transmission collides with a D2D SF, UL transmission is dropped and UL transmission is performed in a next available UL SF. At this time, the eNB may not schedule UL transmission in a D2D SF. That is, if a first SF of bundle transmission, such as SF #22, is configured as a D2D SF, the eNB may transmit a UL grant to the UE in SF #19 instead of SF #18 such that SF #22 does not become a first SF of a specific bundle.

MODIFIED EXAMPLE 8

Figure 25:
FIG. 25 is a diagram showing a method for dealing with collision between TTI bundling and D2D transmission according to one embodiment of the present invention.

The eNB may configure a D2D SF so as to avoid collision. For example, the eNB may configure TTI bundling for D2D communication and assign some of the four HARQ processes to the D2D link. In this case, WAN scheduling of the D2D SF is not performed and collision does not occur. If all processes are being performed before configuring the D2D SF, the eNB may wait until the processes are finished or forcibly finish the processes. FIG. 25 shows the case in which the process 1 is assigned to the D2D link and then UL transmission is performed using the remaining three processes.

Figure 26:
FIG. 26 is a diagram showing a method for dealing with collision between TTI bundling and D2D transmission according to one embodiment of the present invention.

In addition, as shown in FIG. 26, a D2D SF may be configured at a predetermined location of a TTI bundle. At this time, the valid TTI of each bundle may be uniformly maintained. The UE uses a TTI drop method with respect to the D2D SF so as to validly maintain each process.

Third Embodiment—D2D Tx/Rx Configuration Report

The UE may acquire a configuration of a D2D SF from a network and arbitrarily schedule and use assigned resources. That is, if transmission from UE1 to UE2 is D2D Tx and transmission from UE2 to UE1 is D2D Rx, some of D2D SFs may be used for D2D Tx and the remaining D2D SFs may be used for D2D Rx.

The eNB may assign multi-clustering to the UE (multi-clustering means that a maximum of two non-contiguous RB clusters is assigned to one component carrier (CC)). At this time, one cluster may be used for D2D Tx of the UE and the other cluster may be used for WAN UL transmission. If a PUSCH (or AN) transmitted to the eNB and a PUSCH (or AN) transmitted to a peer UE are simultaneously scheduled to the UE in the same SF, WAN UL transmission may not be blocked in the SF scheduled for D2D Tx.

Figure 27:
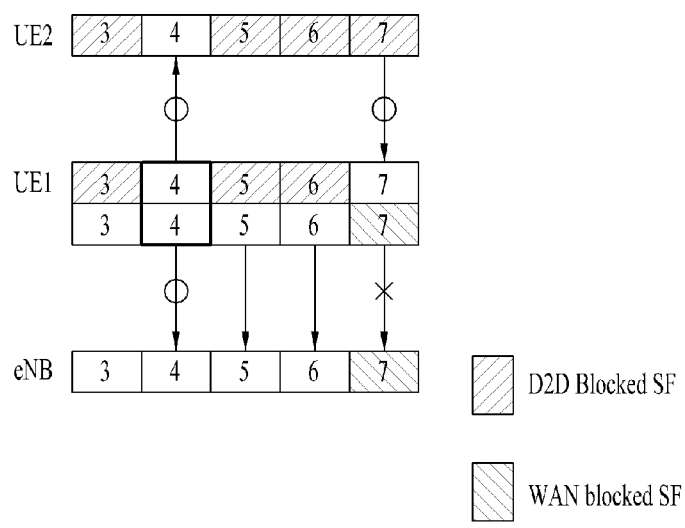
FIG. 27 is a diagram showing an example of multi-clustering transmission according to one embodiment of the present invention.

Accordingly, the UE may report the location of the D2D Tx SF to the eNB such that the eNB performs WAN UL scheduling in the D2D Tx SF and performs WAN UL transmission in the D2D Tx SF. If the configuration of the D2D Tx SF is reported, a bitmap, a start SF location and cycle or an index of a predetermined pattern may be used. At this time, the D2D Tx SF is a valid UL WAN SF when applying the proposed method such as TTI bundling/AN repetition and is not regarded as an SF in which WAN operation is blocked and collision between D2D operation and UL WAN operation does not occur. FIG. 27 shows the case in which WAN UL is blocked in SF #7 in which UE1 operates as D2D Rx, WAN UL may be scheduled to SF #4 in which UE1 operates as D2D Tx, and WAN UL transmission is possible in the corresponding SF.

In addition, the eNB may schedule WAN UL of another UE in a D2D Rx SF in which UE1 operates as D2D Rx. In particular, if another UE performs UL multi-SF transmission such as TTI bundling, TTI drop/shift of the SF is not performed.

If unidirectional communication from UE1 to UE2, such as the case in which UE broadcasts data received from the eNB to UEs located outside cell coverage, is only performed, all D2D SFs are used for D2D Tx and WAN UL is not blocked.

In addition, when the eNB also performs D2D Tx/Rx scheduling, the D2D Tx/Rx configuration report of the UE may be omitted.

As described above, when UE1 performs a D2D Tx/Rx configuration, the configuration information should be delivered to the peer UE2. UE1 may perform D2D Tx/Rx configuration or reconfiguration according to the request of UE2 and deliver confirmation information thereof to UE2.

Fourth Embodiment—TTI Bundling in D2D Link

Even in communication of a D2D link, for the purpose of improving coverage between UEs, transmission using a plurality of SFs, such as TTI bundling, may be performed. That is, although TTI bundling is used in WAN UL from a UE to an eNB in the above-described examples, the above-described examples are applicable to D2D communication between UEs.

In this case, similarly to the case in which a WAN UL SF is blocked due to a D2D SF in a WAN UL link, a D2D SF may be blocked due to a WAN UL SF in a D2D link.

Accordingly, operation when a WAN UL SF appears during bundled transmission in a D2D link may be defined using one of the above-proposed methods. At this time, which of the above-proposed methods is applied may be negotiated between UEs, which will perform communication via a D2D link, in advance or may be signaled from a transmission UE to a peer UE via a physical layer and/or higher layer signal.

In particular, if communication in a D2D link is a broadcast, HARQ ACK is not transmitted and retransmission is not performed. Accordingly, if a WAN UL SF is located in SFs in which a TTI bundle is scheduled, bundle transmission is unpreferably dropped. TTI drop or TTI shift may be performed with respect to the corresponding SF. In general, since the UE does not schedule a first PUSCH of the bundle in the WAN UL SF, the case, in which first PUSCH transmission is performed in a D2D blocked SF to drop a TTI bundle, does not occur.

The UE must send information on a D2D blocked SF to the peer UE. The information on the D2D blocked SF may include a UL SF which may not be used due to WAN UL and an SF set as DL in the case of TDD.

If a TTI shift method is applied to the D2D blocked SF, a transmission time of a specific bundle may be extremely delayed (the length of the D2D blocked SF is long or the D2D blocked SF frequently appears). In this case, a maximum value of the length of the SF to which TTI shift is applicable may be set to prevent the same bundle from being transmitted during a predetermined time interval or more or the UE may request a reconfiguration of a D2D SF from the eNB.

In particular, the eNB may configure an additional resource (RB) region of (some) UL SFs to enable D2D transmission to the UE capable of performing multi-clustering transmission and notify the UE of configuration information. Since the UE may perform WAN UL transmission and D2D transmission in such UL SFs, the SF may not be dropped or shifted upon TTI bundling.

At this time, information indicating whether a D2D bundle is dropped/shifted or transmission is performed in a UL SF may be signaled to the peer UE (that is, the reception UE). This is because D2D transmission in the UL SF may differ between UEs according to transmit power restriction and multi-clustering transmission performance of the transmission UE. If one UE requires high transmit power in UL transmission, D2D simultaneous transmission may be dropped and the UE may arbitrarily determine whether D2D simultaneous transmission is performed in a UL SF.

In order to notify the UE of information indicating in which UL SF D2D transmission is performed, the SF may be included or dropped in or from the information on the D2D blocked SF using the method for delivering the information on the D2D blocked SF to the UE.

Figure 28:
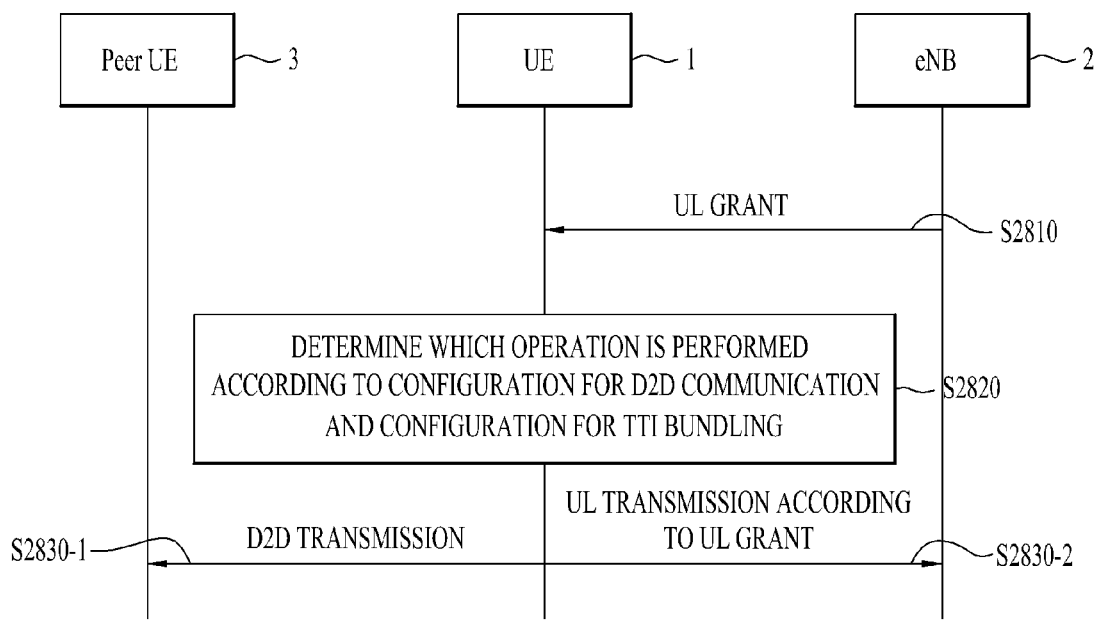
FIG. 28 is a flowchart illustrating operation according to embodiment(s) of the present invention.
Figure 29:
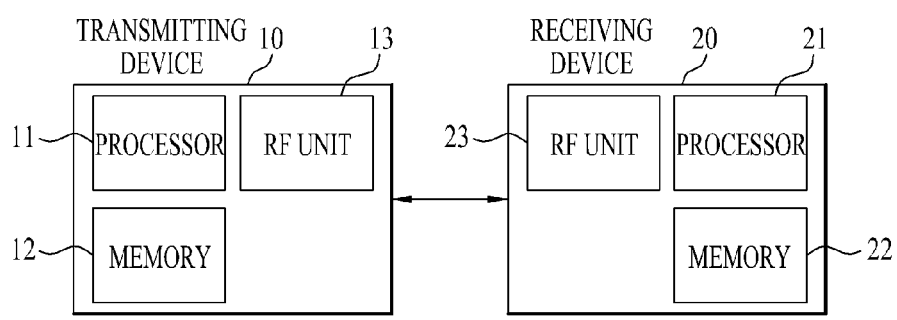
FIG. 29 is a block diagram of an apparatus for implementing embodiment(s) of the present invention.

FIG. 28 shows operation according to one embodiment of the present invention.

A UE 1 may receive an uplink (UL) grant from a serving eNB 2 (S2810).

The UE 1 performs UL transmission to the serving eNB according to the UL grant. In the flowchart of FIG. 28, assume that TTI bundling is configured in UL transmission and D2D communication is also configured because the UE is scheduled to perform D2D communication with a peer UE 2.

Accordingly, if TTI bundling transmission and D2D communication are simultaneously scheduled, the UE 1 may determine which operation is performed based on a configuration for D2D communication and a configuration for TTI bundling (S2820).

When bundled UL transmission based on the UL grant and D2D communication transmission are scheduled in the same TTI, the UE 1 may perform UL transmission scheduled in the above TTI in a first available TTI after the above TTI and perform D2D communication in the above TTI (S2830-1).

If two bundled UL transmissions according to two different UL grants are scheduled in the same TTI, the UE 1 may drop bundled UL transmission according to the later received UL grant of the two UL grants and perform bundled UL transmission according to the first received UL grant of the two UL grants (S2830-2). Step S2830-2 is performed when specific UL transmission is delayed to a specific TTI due to collision and UL transmission according to another UL grant is scheduled in the specific TTI, unlike collision between D2D transmission and UL transmission in step S2830-1.

That is, in one embodiment of the present invention shown in FIG. 28, a transmission method in a TTI or SF may be determined depending on whether UL transmission in the TTI or SF collides with D2D transmission or whether UL transmission in the TTI or SF collides with UL transmission according to another UL grant.

Although the embodiments of the present invention are briefly described with reference to FIG. 28, the embodiment related to FIG. 28 may alternatively or additionally include at least some of the above-described embodiment(s).

FIG. 28 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitter and the receiver. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a media access control (MAC) layer. One transport block (TB) is encoded into one codeword and each codeword is transmitted to the receiver in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. If the RF unit supports a multiple input multiple output (MIMO) function for transmitting and receiving data using a plurality of antennas, two or more antennas may be connected.

In the embodiments of the present invention, a UE operate as the transmitting device 10 in uplink and operates as the receiving device 20 in downlink. In the embodiments of the present invention, an eNB operates as the receiving device 20 in uplink and operates as the transmitting device 10 in downlink.

The transmitter and/or the receiver may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for transmitting an uplink signal of a user equipment (UE) in a wireless communication system, the method comprising:

receiving, by the UE, a first uplink (UL) grant from a serving base station (BS); and performing, by the UE, a first bundled UL transmission (Tx) based on the first UL grant and device-to-device (D2D) reception/transmission (Rx/Tx) using a configuration for D2D communication and a configuration for transmission time interval (TTI) bundling, wherein, when a specific UL Tx of the first bundled UL Tx and the D2D Rx/Tx are simultaneously scheduled in a specific TTI, a part of the first bundled UL Tx corresponding from the specific UL Tx to a last UL Tx of the first bundled UL Tx is shifted, by the UE, to at least one available TTI after the specific TTI.

2. The method according to claim 1, wherein, when the specific UL Tx of the first bundled UL Tx and the D2D Rx/Tx are simultaneously scheduled in the specific TTI and the specific UL Tx is a first UL Tx of the first bundled UL Tx, all of the first bundled UL Tx is dropped.

3. The method according to claim 1, wherein the configuration for D2D communication includes information on a subframe or TTI configured for D2D communication.

4. The method according to claim 1, further comprising receiving the configuration for D2D communication and the configuration for TTI bundling.

5. A user equipment (UE) configured to transmit an uplink signal in a wireless communication system, the UE comprising:

a radio frequency (RF) unit; and a processor configured to control the RF unit, wherein the processor is configured to receive a first uplink (UL) grant from a serving base station (BS) and to perform a first bundled UL transmission (Tx) based on the first UL grant and device-to-device (D2D) reception/transmission (Rx/Tx) using a configuration for D2D communication and a configuration for transmission time interval (TTI) bundling, wherein, when a specific UL Tx of the first bundled UL Tx and the D2D Rx/Tx are simultaneously scheduled in a specific TTI, a part of the first bundled UL Tx corresponding from the specific UL Tx to a last UL Tx of the first bundled UL Tx is shifted to at least one available TTI after the specific TTI.

6. The UE according to claim 5, wherein, when the specific UL Tx of the first bundled UL Tx and the D2D Rx/Tx are simultaneously scheduled in the specific TTI and the specific UL Tx is a first UL Tx of the first bundled UL Tx, all of the first bundled UL Tx is dropped.

7. The UE according to claim 5, wherein the configuration for D2D communication includes information on a subframe or TTI configured for D2D communication.

8. The UE according to claim 5, wherein the processor is configured to receive the configuration for D2D communication and the configuration for TTI bundling.

9. The method according to claim 1, further comprising:
receiving a second UL grant from the serving BS after that the first UL grant is received; and
when the shifted part of the first bundled UL Tx and at least a part of a second bundled UL Tx based on the second UL grant are simultaneously scheduled, shifting the second bundled UL Tx to available TTIs after that the shifted part of the first bundled UL Tx is finished.

10. The method according to claim 1, further comprising:
receiving a second UL grant from the serving BS after that the first UL grant is received; and
when the shifted part of the first bundled UL Tx and at least a part of a second bundled UL Tx based on the second UL grant are simultaneously scheduled, dropping the part of the second bundled UL Tx and performing the second bundled UL Tx except the dropped part of the second bundled UL Tx.

11. The method according to claim 1, further comprising:
receiving a second UL grant from the serving BS after that the first UL grant is received; and
when the shifted part of the first bundled UL Tx and a part of a second bundled UL Tx based on the second UL grant are simultaneously scheduled, dropping all of the second bundled UL Tx.

12. The method according to claim 5, the processor is further configured to:
receive a second UL grant from the serving BS after that the first UL grant is received; and
when the shifted part of the first bundled UL Tx and at least a part of a second bundled UL Tx based on the second UL grant are simultaneously scheduled, shift the second bundled UL Tx to available TTIs after that the shifted part of the first bundled UL Tx is finished.

13. The method according to claim 5, the processor is further configured to:
receive a second UL grant from the serving BS after that the first UL grant is received; and
when the shifted part of the first bundled UL Tx and at least a part of a second bundled UL Tx based on the second UL grant are simultaneously scheduled, drop the part of the second bundled UL Tx and perform the second bundled UL Tx except the dropped part of the second bundled UL Tx.

14. The method according to claim 5, the processor is further configured to:
receive a second UL grant from the serving BS after that the first UL grant is received; and
when the shifted part of the first bundled UL Tx and a part of a second bundled UL Tx based on the second UL grant are simultaneously scheduled, drop all of the second bundled UL Tx.

* * * * *